(12) United States Patent
Nakaji

(10) Patent No.: US 6,661,570 B2
(45) Date of Patent: *Dec. 9, 2003

(54) OPTICAL AMPLIFIER, OPTICAL COMMUNICATION SYSTEM INCLUDING THE SAME, AND OPTICAL FIBER MODULE INCLUDED IN THE SAME

(75) Inventor: Haruo Nakaji, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 63 days.

This patent is subject to a terminal disclaimer.

(21) Appl. No.: 10/025,574

(22) Filed: Dec. 26, 2001

(65) Prior Publication Data

US 2002/0114066 A1 Aug. 22, 2002

Related U.S. Application Data

(63) Continuation-in-part of application No. 09/791,764, filed on Feb. 26, 2001, now Pat. No. 6,396,625.

(30) Foreign Application Priority Data

Dec. 26, 2000 (JP) ..................................... P2000-395516
May 21, 2001 (JP) ..................................... P2001-151312

(51) Int. Cl.[7] .............................................. H01S 3/00
(52) U.S. Cl. .............................. 359/341.41; 359/341.43
(58) Field of Search ........................ 359/341.41, 341.43

(56) References Cited

U.S. PATENT DOCUMENTS

| 5,537,244 A | 7/1996 | Fukushima et al. |
| 5,764,404 A | 6/1998 | Yamane et al. |
| 6,229,643 B1 * | 5/2001 | Nakamura .................. 359/341 |
| 6,396,625 B1 * | 5/2002 | Nakaji .................. 359/341.41 |

FOREIGN PATENT DOCUMENTS

| JP | 08-179388 | 7/1996 |
| JP | 09-064437 | 3/1997 |
| JP | 09-200145 | 7/1997 |

OTHER PUBLICATIONS

Seo Yeon Park, et al., "Dynamic Gain and Output Power Control in a Gain–Flattened Erbium–Doped Fiber Amplifier," IEEE Photonics Technology Letters, vol. 10, No. 6, Jun. 1998, pp. 787–789.

A. K. Srivastava, et al. "EDFA Transient Response to Channel Loss in WDM Transmission System," IEEE Photonics Technology Letters, vol. 9, No. 3, Mar. 1997, pp. 386–388.

* cited by examiner

*Primary Examiner*—Mark Hellner
(74) *Attorney, Agent, or Firm*—McDermott, Will & Emery

(57) ABSTRACT

The present invention relates to an optical amplifier and the like comprising a structure for effectively suppressing transient output signal power fluctuations caused by delays in control. The optical amplifier including an amplification optical fiber comprises a control system (17) for monitoring, through a light-receiving device, power fluctuations in part of light tapped by a branching device and regulating the power of pumping light outputted from a pumping light source. A delay medium is disposed between the branching device and the amplification optical fiber, so as to reduce the difference between the time required for signals transmitted through the branching device to reach the input end of the amplification optical fiber and the response time of the control system, thereby suppressing fluctuations in the output signal level.

23 Claims, 10 Drawing Sheets

OPTICAL AMPLIFIER, OPTICAL COMMUNICATION SYSTEM INCLUDING THE SAME, AND OPTICAL FIBER MODULE INCLUDED IN THE SAME

RELATED APPLICATIONS

This is a Continuation-In-Part application of application Ser. No. 09/791,764 filed on Feb. 26, 2001, now U.S. Pat. No. 6,396,625.

BACKGROUND OF THE INVENTION

1. Field of the Invention

The present invention relates to an optical amplifier applicable to wavelength division multiplexing (WDM) transmission systems, an optical communication system including the optical amplifier, and an optical fiber module constituting a part of the optical amplifier.

2. Related Background Art

In WDM transmission systems including optical amplifiers as optical communication systems, OADM (Optical Add/Drop Multiplexer) and OXC (Optical Cross Connect) have recently been incorporated as structures for separating a part of multiplexed signals by signal channel units or sending out a predetermined wavelength of signals or multiplexed signals to transmission lines by signal channel units in order to improve the reliability and operating efficiency of each system as a whole. In such a WDM system, attention is paid to transitional output signal power fluctuations in optical amplifiers occurring due to changes in the number of channels of inputted signals. Therefore, it is required for optical amplifiers to be controlled such that the output signal power (output signal level) per channel becomes constant even if the input power changes.

As means for suppressing the transitional output signal power fluctuations caused by input signal power fluctuations occurring due to changes in the number of signal channels, high-speed automatic gain control (AGC) has been proposed.

Here, the response speed of AGC is required to become faster as the speed at which the number of signal channels changes is faster, and as the number of the added or dropped signal increases.

As a technique for speeding up AGC, Seo Yeon Park, et al., "Dynamic Gain and Output Power Control in a Gain-Flattened Erbium-Doped Fiber Amplifier," IEEE PHOTONICS TECHNOLOGY LETTERS, Vol. 10, No. 6, JUNE 1998, for example, proposes feed-forward control by detecting only the power of input signal (input signal level), and a pumping light power corresponding to the power of input signal is calculated by use of a linear expression, so as to maintain a constant gain. This AGC technique can achieve higher speed more easily as compared with conventional feedback control, whereby a response time of 650 ns is realized in actually developed control circuits.

SUMMARY OF THE INVENTION

The inventor has studied the prior art and, as a result, has found a problem as follows. Namely, even if feed-forward control is carried out in a conventional optical amplifier by detecting power fluctuations in input signals, the control starting time will be delayed due to a delay in a control circuit, whereby overshoot may occur by the amount of delay in the control circuit.

If the response time of the control circuit controlling a pumping light source is substantially zero, the power of pumping light outputted from the pumping light source can be regulated at substantially the same time when a power fluctuation in input signals is detected in the vicinity of an input end of an optical amplifier (the fluctuation is detected before amplification), whereby transient power fluctuations in output signals will hardly occur. However, actual control circuits have a response time to a certain extent. Therefore, even if a power fluctuation in input signals is detected in the vicinity of an input end of an optical amplifier (at the point of time indicated by arrow A in FIG. 1), a transient power fluctuation (dynamic gain fluctuation PD) in output signals will occur in an optical amplifier for the duration of response time t, of the control circuit after the actual power fluctuation in input signals is generated as shown in FIG. 1 (see A. K. Srivastava, et al., "EDFA Transient Response to Channel Loss in WDM Transmission System," IEEE PHOTONICS TECHNOLOGY LETTERS, Vol. 9, No. 3, MARCH 1997). Also, Y. Sun et al., "Fast power transients in WDM optical networks with cascaded EDFAs," ELECTRONIC LETTERS, Feb. 13, 1997, Vol. 3, No. 4 indicate that transient gain fluctuations accumulate in a system in which optical amplifiers (EDFAs) are connected in a multistage fashion.

However, the change delay time of the pumping light power evaluated in the above-mentioned Srivastava reference with respect to the power fluctuation in input signals is 7 $\mu$s or more, whereby it is unknown whether the transient power fluctuation in output signals can fully be suppressed or not if the delay time further approaches zero. Also, it does not mention any difference in response of the optical amplifier depending on the wavelength of pumping light.

In order to overcome the above-mentioned problem, it is an object of the present invention to provide an optical amplifier comprising a structure which can effectively suppress transient output signal power fluctuations (gain fluctuations) occurring due to delays in control, an optical fiber module included in the same, and an optical communication system comprising a structure for effectively restraining the power fluctuations from accumulating.

The optical amplifier according to the present invention is an optical device, employed in a WDM transmission system for transmitting a plurality of channels of signals included in a predetermined signal wavelength band, for amplifying the signals propagating through an optical transmission line included in the WDM transmission system.

In order to overcome the above-mentioned problem, the optical amplifier according to the present invention comprises, at least, a branching device, a light-receiving device, an amplification optical device (amplification optical fiber), a pumping light source, a delay medium, and a control system. The branching device taps part of light including the signals propagating through the optical transmission line. The light-receiving device detects a power fluctuation (level fluctuation) of the part of light tapped by the branching device. The amplification optical fiber is an optical fiber doped with a rare-earth element or the like for amplifying the signals. The pumping light source launches pumping light of a predetermined wavelength into the amplification optical fiber. The delay medium is an optical device, arranged between the branching device and the amplification optical fiber, for delaying the light reaching the input end of the amplification optical fiber from the branching device. The control system monitors, by way of the light-receiving device, the power of the part of light tapped by the branching device, and controls the pumping light source.

Transient power fluctuations in output signals can fully be suppressed if the pumping light power can intentionally be changed at the same time when the fluctuation in input signal level occurring in the vicinity of the input end of the optical amplifier is detected (the amount of change in pumping light power being adjusted according to the amount of fluctuation in input signal power). However, it is unrealistic for the response time from the detection of fluctuation to the power control of pumping light to become zero. Therefore, the present invention utilizes the delay medium, so as to delay the signal input to the amplification optical fiber, thus making it possible to detect the input signal power before amplification.

Preferably, in the optical amplifier according to the present invention, the delay medium has an insertion loss of 3 dB or less. This is because of the fact that it can effectively restrain transient or dynamic power fluctuations from occurring due to changes in the number of signal channels while suppressing an excess degradation of noise figure.

Specifically, it is preferred that the signal delay time given by the delay medium be at least 1 $\mu$s but not longer than 50 $\mu$s. Preferably, the delay medium includes a single-mode optical fiber having a length of at least 0.2 km but not longer than 10 km. Since the transmission loss of a single-mode optical fiber is usually about 0.2 dB/km, it can minimize the degradation of noise figure in the optical amplifier, and can delay input signals to the amplification optical fiber by a time within the range of 1 $\mu$s to 50 $\mu$s. As the optical fiber employed in the delay medium, a pure silica core fiber having a low loss and a low bending loss is preferable for allowing the optical amplifier to realize a smaller size.

In the case where the delay medium is longer, the delay medium preferably includes a dispersion-shifted optical fiber in order to restrain the dispersion of the delay medium itself from increasing. The delay medium may also include a dispersion-compensating optical fiber arranged between the single-mode optical fiber and the amplification optical fiber. This is because of the fact that, when a high-speed operation is required in L band (1565 nm to 1620 nm) in the optical amplifier, it will be preferable if the dispersion of the amplification optical fiber is compensated for in order to improve the dispersion tolerance of the optical amplifier.

The inventor has also found that the response characteristic of the optical amplifier depends on the pumping light wavelength. In the case of an optical amplifier employing 0.98 $\mu$m as its pumping light wavelength, the signal delay time given by the delay medium must be longer than the response time of the control system from when the signal power fluctuation is detected until when the control of the pumping light source is started. This is because of the fact that transient power fluctuations of an output signal cannot fully be suppressed in the optical amplifier pumped with the pumping light having a wavelength of 0.98 $\mu$m even when the pumping light power is changed at substantially the same time when the power of an input signal fluctuates. In the case of the optical amplifier employing 0.98 $\mu$m as its pumping light wavelength, the signal delay time given by the delay medium is preferably adjusted such that, in terms of the transient fluctuation of the gain in the optical amplifier caused by a power fluctuation in the input signal with respect to a target gain, the gain yields an overshoot amount and an undershoot amount which are substantially identical to each other.

In the case of an optical amplifier employing 1.48 $\mu$m as its pumping light wavelength, it is preferred that the signal delay time given by the delay medium be substantially identical to the response time of the control system from when the signal power fluctuation is detected until when the control of the pumping light source is started. This is because of the fact that transient power fluctuations of the output signal can fully be suppressed in this case unlike the above-mentioned case where the pumping light wavelength is 0.98 $\mu$m.

Preferably, the signal delay time given by the delay medium is adjusted so as to become longer than the sampling time of the control system for monitoring the light tapped by the branching device. This aims at making it possible to adjust the pumping light power in conformity to power fluctuations in input signals.

The control system carries out AGC by utilizing a linear expression $P_P = a \cdot P_{IN} + b$ (where a and b are constants) which provides a relationship between the power $P_{IN}$ of the part of light tapped by the branching device and the power $P_P$ of the pumping light outputted from the pumping light source. This aims at enabling high-speed control by use of feed-forward control. However, even when transient power fluctuations in the output signal are suppressed during the control time $t_2$ as shown in FIG. 1, there is a possibility of a static gain fluctuation $P_Q$ occurring if AGC is carried out in a state where the average value (time average) of saturation power of output signals varies between before and after the fluctuation.

Therefore, it is preferred that the optical amplifier according to the present invention further comprise a spectrum analyzer for monitoring a signal distribution within a signal wavelength band at the output end of the amplification optical fiber. Here, the control system detects the signal distribution within the signal wavelength band at the output end of the amplification optical fiber, and updates the constants a and b in the above-mentioned linear expression utilized for AGC.

For effectively suppressing the static gain fluctuation $P_Q$, the control system may update the constants a and b in the above-mentioned linear expression utilized for AGC by using an amplification factor ($P_{OUT}/P_{IN}$) given by the ratio between the amplified optical power $P_{OUT}$ at the output end of the amplification optical fiber and the power $P_{IN}$ of the part of light tapped by the branching device.

Preferably, the optical amplifier according to the present invention further comprises a branching device for tapping part of amplified light transmitted through the amplification optical fiber, and a light-receiving device for detecting a power of the light tapped by the branching device. In this case, the control system monitors respective powers of parts of light tapped by the two branching devices disposed upstream and downstream the amplification optical fiber by way of their corresponding light-receiving devices, and controls the pumping light source so as to adjust the pumping light power according to results of detection obtained by these light-receiving devices.

The optical communication system according to the present invention includes a plurality of optical amplifiers at least one of which has a structure identical to that of the optical amplifier comprising the structure mentioned above. Preferably, this optical communication system comprises a structure for enabling at least one of a branching function of tapping part of multiplexed signals propagating through a transmission line by a signal channel unit, and an inserting function of sending out a predetermined wavelength of signals or multiplexed signals to a transmission line by a signal channel unit, e.g., OADM or OXC.

The optical amplifier according to the present invention preferably includes an optical fiber module having respective terminals to be connected to the light-receiving device, pumping light source, and optical transmission line so as to reduce the insertion loss of the optical amplifier. The optical fiber module comprises a single-mode optical fiber to be fusion-spliced to the optical transmission line, a delay fiber acting as the delay medium to be fusion-spliced to the single-mode optical fiber, an amplification optical fiber to be fusion-spliced to the delay fiber, a first fiber coupler for tapping part of light including a signal having reached the optical amplifier before being fed to the delay fiber, and a second fiber coupler for supplying the pumping light from at least one of the input and output ends of the amplification optical fiber.

Specifically, the single-mode optical fiber has a first end to be fusion-spliced to the output end of the optical transmission line through which a plurality of channels of signals included in a predetermined signal wavelength band propagate, and a second end opposing the first end; and constitutes a part of the optical transmission line. The delay fiber has a first end fusion-spliced to the second end of single-mode optical fiber, and a second end opposing the first end. The amplification optical fiber has a first end fusion-spliced to the second end of delay fiber, and a second end opposing the first end. The first fiber coupler is arranged near a fused part between the second end of single-mode optical fiber and the first end of delay fiber. Preferably, the second fiber coupler is arranged near a fused part between the second end of delay fiber and the first end of amplification optical fiber, or near the second end of amplification optical fiber.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 9A is a diagram showing the structure of an optical amplifier utilizing pumping light having a wavelength of 0.98 $\mu$m as an optical amplifier (EDFA) employed in the experimental system shown in FIG. 8, whereas

FIG. 10A is a graph showing the time response of total input power in the experimental system shown in FIG. 8, whereas

FIG. 11A is a graph showing the transient response characteristic with respect to a residual signal having a wavelength of 1551.7 nm concerning the optical amplifier having a pumping light wavelength of 0.98 $\mu$m shown in FIG. 9A, whereas

FIG. 12A is a graph showing the dependence of transient response characteristic upon delay time concerning the optical amplifier having a pumping light wavelength of 0.98 $\mu$m shown in FIG. 9A with respect to each of residual signals having a wavelength ranging from 1531.7 nm to 1561.4 nm, whereas FIG. 13A is a graph showing the transient response characteristic with respect to a residual signal having a wavelength of 1551.7 nm in the case where a single-mode optical fiber having a length of 400 nm is not employed as the delay medium in the optical amplifier shown in FIG. 5, whereas

DESCRIPTION OF THE PREFERRED EMBODIMENTS

Figure 1:
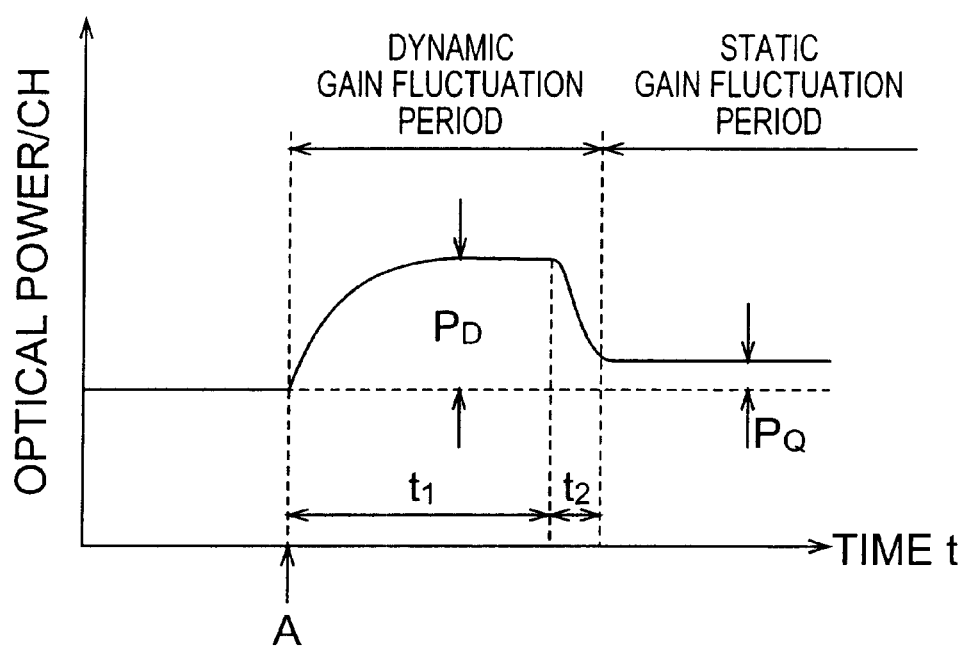
FIG. 1 is a graph for explaining a problem of AGC in a conventional optical amplifier.

In the following, embodiments of the optical amplifier according to the present invention and the optical fiber module included therein will be explained with reference to FIGS. 2 to 8 and 9A to 13B. In the explanation of drawings, constituents identical to each other will be referred to with numerals identical to each other without repeating their overlapping descriptions. The proportions of dimensions in the drawings do not always match those explained.

Figure 2:
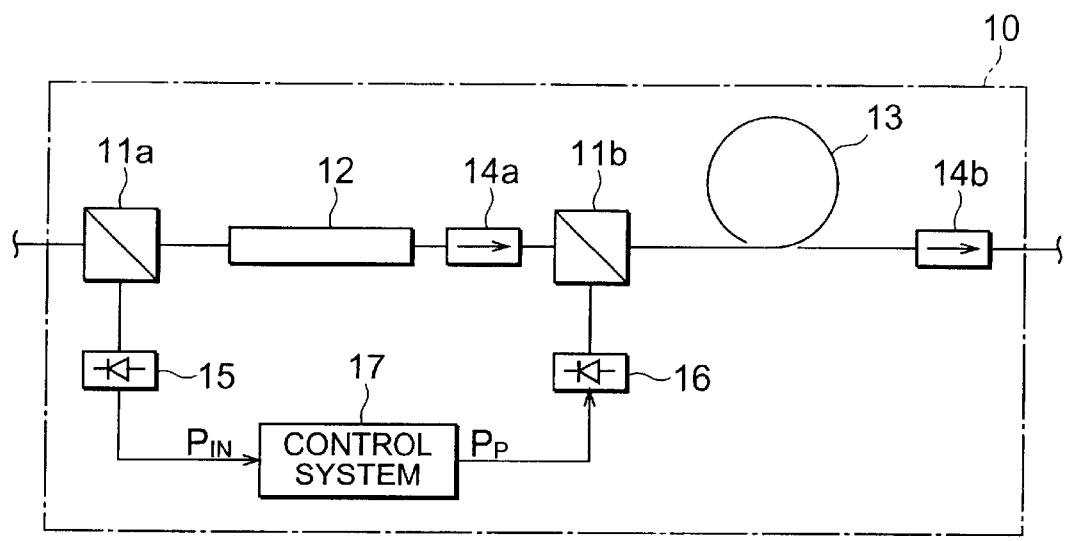
FIG. 2 is a diagram showing the configuration of a first embodiment of the optical amplifier according to the present invention.

FIG. 2 is a diagram showing the configuration of a first embodiment of the optical fiber amplifier according to the present invention. In FIG. 2, the optical amplifier 10 according to the first embodiment comprises, successively in the advancing direction of signal light, a branching device 11a, a delay medium 12, an optical isolator 14a, a multiplexer 11b, an amplification optical fiber 13, and an optical isolator 14b, which constitute a part of an optical transmission line. The branching device 11a taps part of light including a plurality of channels of signals having reached there from an optical transmission line. The delay medium 12 functions such that signals transmitted through the branching device 11a delay reaching the input end of the amplification optical fiber 13. The multiplexer 11b combines pumping light and the signal transmitted through the delay medium 12, and launches thus combined light into the amplification optical fiber 13 from the input end side thereof.

The optical amplifier 10 further comprises a light-receiving device 15 (PD) for monitoring the power of the part of light tapped by the branching device 11a, a pumping light source 16 (LD), and a control system 17 which controls the pumping light source 16 in conformity to power fluctuations of the tapped part of light (in a feed-forward control fashion) while monitoring the power of tapped part of light by way of the light-receiving device 15.

In general, the gain coefficient $\gamma_s$ in an optical amplifier having an amplification optical fiber doped with erbium or the like is approximately represented by the following expression (1):

$$\gamma_s = \frac{g}{1 + \frac{P_P^{th}}{P_P} \cdot \frac{P_S}{P_{sat}}} \quad (1)$$

where g is the unsaturated gain;
$P_P^{th}$ is the threshold power of pumping light;
$P_P$ is the pumping light power;
$P_S$ is the signal power; and
$P_{sat}$ is the saturation power.

According to the above-mentioned expression (1), for making the gain coefficient $\gamma_s$ constant, i.e., for making the gain of optical amplifier constant, it will be sufficient if $(P_P^{th} \cdot P_S)/(P_P^{th} \cdot P_{sat})$ is made constant. If the power of input signal is determined, then the pumping light power necessary for AGC is calculated by the above-mentioned expression (1). Therefore, utilizing this expression (1) enables AGC based on feed-forward control (regulating the pumping light power while monitoring only the input signal power). Here, the pumping light power $P_P$ necessary for the above-mentioned AGC can be represented by the following linear expression (2):

$$P_P = a \cdot P_{IN} + b \quad (2)$$

where $P_P$ is the pumping light power;
$P_{IN}$ is the input signal power; and
a and b are constants.

Feed-forward control can realize higher-speed AGC as compared with feedback control in which input and output are detected. However, if the signal power is detected at the input end of the optical amplifier, and the pumping light power is controlled according to the result of detection, then the power of input signals will fluctuate by the response time of the control system, whereby a transient power fluctuation may occur in output signals.

A. K. Srivastava, "EDFA Transient Response to Channel Loss in WDM Transmission System," IEEE PHOTONICS TECHNOLOGY LETTERS, Vol. 9, No. 3, MARCH 1997 reports transient output signal power fluctuations caused by delays in regulation of pumping light power with respect to power fluctuations in input signals. From this report, it can be seen that the transient power fluctuations in output signals can be suppressed more as delays in regulation of pumping light power with respect to power fluctuations in input signals are smaller. Ideally, the transient power fluctuations in output signals can substantially be suppressed to zero if the pumping light power can be changed by an appropriate amount at the same time when a power fluctuation is generated in input signals. Though the response time in the control system may be made sufficiently short in order to address the above-mentioned problem, there is a limit to shortening the response time of the control system.

Therefore, the optical amplifier according to the present invention is provided with a structure for delaying signals to a certain extent (at least by the response time of the control system) during the period of time from when a change in power of input signals is detected until when a fluctuation in signal power occurs at the input end of the amplification optical fiber. This structure can make the power fluctuation timing of input signals at the input end of amplification optical fiber and the fluctuation timing of pumping light power coincide with each other, whereby the transient power fluctuations in output signals can be suppressed effectively. Also, since the input signals are delayed by an appropriate amount, the response speed required for the control system is alleviated, which makes it easier to design the control system.

Operations of the optical amplifier 10 according to the first embodiment will now be explained with reference to FIG. 2. In the optical amplifier 10, part of light including a plurality of channels of signals propagated through an optical transmission line is tapped by the branching device 11a, and power fluctuations of thus tapped part of light are detected by the light-receiving device 15. On the other hand, the remaining part of light transmitted through the branching device 11a passes through the delay medium 12, optical isolator 14a, and multiplexer 11b in succession, so as to reach the amplification optical fiber 13. While the light transmitted through the branching device 11a is propagating through the delay medium 12, the control system 17 detects the power fluctuation of input signals by way of the light-receiving device 15, and controls the pumping light source 16 so as to change the pumping light power.

At the input end of amplification optical fiber 13, due to the foregoing configuration, the input signals and pumping light attain a state where their respective power fluctuations are substantially synchronized with each other. As a result, signals amplified by the optimized gain are outputted from the amplification optical fiber 13, and thus amplified signals are sent out to an optical transmission line by way of the optical isolator 14b.

For improving the noise figure of the optical amplifier 10, it is necessary that at least the loss at the input end of amplification optical fiber 13 be made as low as possible. Therefore, it is preferred that the insertion loss of the delay medium 12 inserted into the input end side of the amplification optical fiber 13 be as small as possible. In this regard, a single-mode optical fiber having an insertion loss of 3 dB or less is suitable, and can yield a delay of about 5 µs per km.

In the case where an optical fiber having a large chromatic dispersion is employed as an optical fiber acting as the delay medium 12 (hereinafter referred to as delay fiber), a separate dispersion-compensating optical fiber is necessary. Preferably, the delay fiber has a chromatic dispersion which is as small as possible, since it eliminates the need for inserting a separate optical fiber which compensates for the dispersion. In the case where the delay fiber is longer, the delay fiber preferably includes a dispersion-shifted optical fiber in order to restrain the dispersion of the delay fiber itself from increasing. The delay fiber may include a dispersion-compensating optical fiber disposed between the single-mode optical fiber and the amplification optical fiber. This is because of the fact that, when a high-speed operation is required in L band (1565 nm to 1620 nm) in the optical amplifier, it is preferred that the dispersion of the amplification optical fiber 13 be compensated for in order to improve the dispersion tolerance of the optical amplifier 10.

In general, a WDM transmission system having a transmission capacity per signal channel of 10 Gbit/s can permit a cumulative dispersion up to ±1000 ps/nm. From this fact, a dispersion of ±200 ps/nm or less caused by the delay fiber is considered to be a permissible range in a WDM transmission system in which five stages of repeaters are inserted. It is needless to say that the cumulative dispersion should be further lowered as the transmission capacity per signal channel increases from now on.

Figure 3:
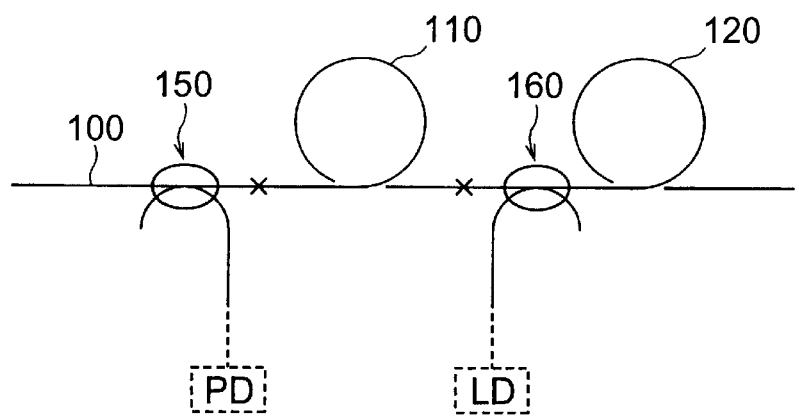
FIG. 3 is a diagram showing a specific configuration of the optical fiber module according to the present invention.

As mentioned above, the optical amplifier according to the present invention preferably includes an optical fiber module having respective terminals to be connected to the above-mentioned light-receiving device, pumping light source, and optical transmission line in order to reduce the insertion loss of the optical amplifier as shown in FIG. 3. The optical fiber module shown in FIG. 3 comprises a single-mode optical fiber 100 to be fusion-spliced to the optical transmission line, a delay fiber 110 (corresponding to the delay medium 12 in FIG. 2) to be fusion-spliced to the single-mode optical fiber 100, an amplification optical fiber 120 (corresponding to the amplification optical fiber 13 in FIG. 2) to be fusion-spliced to the delay fiber 110, a first fiber coupler 150 (corresponding to the branching device 11a in FIG. 2) for tapping part of light including signals having reached the optical amplifier before being fed into the delay fiber 110, and a second fiber coupler 160 (corresponding to the multiplexer 11b in FIG. 2) for supplying pumping light from at least one of the input and output ends of the amplification optical fiber 120. Thus, the input ends of the fiber couplers 150, 160 to which the light-receiving device and pumping light source are to be connected are open in the optical fiber module shown in FIG. 3, whereby users can select the light-receiving device and pumping light source in conformity to the design specification of the whole WDM transmission system.

Specifically, the single-mode optical fiber 100 in FIG. 3 has a first end to be fusion-spliced to the output end of the optical transmission line through which a plurality of channels of signals included in a predetermined signal wavelength band propagate, and a second end opposing the first end, thereby constituting a part of the optical transmission line. The delay fiber 110 has a first end fusion-spliced to the second end of single-mode optical fiber 100, and a second end opposing the first end. The amplification optical fiber 120 has a first end fusion-spliced to the second end of delay fiber 110, and a second end opposing the first end. The first fiber coupler 150 is disposed near the fused part between the second end of single-mode optical fiber 100 and the first end of delay fiber 110. The second fiber coupler 160 is disposed near the fused part between the second end of delay fiber 110 and the first end of amplification optical fiber 120. For suppressing the deterioration of noise figure to the minimum, as mentioned above, the delay fiber 110 preferably includes an optical fiber having an insertion loss of 3 dB or less. In the case where the delay fiber 110 is longer, it preferably includes a dispersion-shifted optical fiber. For compensating for the dispersion of amplification optical fiber 120, the delay fiber 110 may include a dispersion-compensating optical fiber.

Ideally, since it is necessary to regulate (change) the pumping light power at the same time when the power of input signals fluctuates, the delay time applied by the delay medium 12 to signals is required to be substantially on a par with the response time of the control system 17 (including an arithmetic processing circuit) for controlling the pumping light source 16. In particular, it is necessary that the sampling time for detecting the input signal power be set sufficiently shorter than the signal delay time given by the delay medium 12. If the sampling time is longer than the signal delay time, then the timing for detecting the power fluctuation itself delays, whereby the delay applied to signals becomes meaningless. The sampling time is also determined by the speed at which the subject input signal power fluctuates.

In the case where the pumping light source 16 changes substantially stepwise, it will be sufficient if the signal delay time given by the delay medium 12 and the response time of the control system 17 (the period of time from when the fluctuation is detected until when the pumping light source 16 is controlled) are made identical to each other. In practice, however, waveforms are somewhat broad. Therefore, if the signal delay time is set slightly longer than the response time of control system 17, then the transient power fluctuations in output signals can effectively be suppressed.

In the feed-forward control (AGC) based on the above-mentioned expressions (1) and (2), AGC can be carried out by use of the above-mentioned expression (2) when the average value of saturation power of multiplexed signals is the same between before and after the power of input signals fluctuates. However, the saturation power is dependent on wavelength, so that the average value of saturation power is not always constant between before and after the fluctuation when the power of input signals fluctuates due to changes in the number of signal channels (see FIG. 1). In the case where the average value of saturation power varies, a static gain fluctuation $P_Q$ will occur if AGC is carried out with the constants a (gradient) and b (intercept) being fixed.

For suppressing such a static gain fluctuation $P_Q$, it is preferred that the position of signal wavelength within a signal wavelength band be monitored, and that the constants a, b in the above-mentioned expression (2) be regulated according to thus detected signal distribution.

Figure 4:
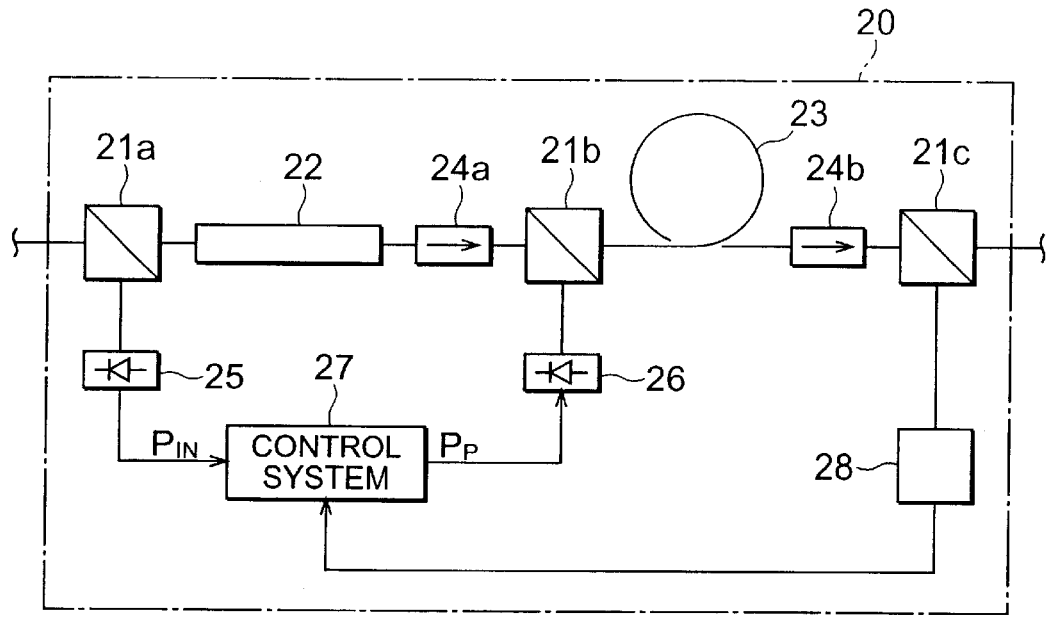
FIG. 4 is a diagram showing the configuration of a second embodiment of the optical amplifier according to the present invention.

FIG. 4 is a diagram showing the configuration of a second embodiment of the optical amplifier according to the present invention accomplished based on the consideration mentioned above.

As shown in FIG. 4, the optical amplifier 20 according to the second embodiment has the same configuration as that of the first embodiment in that it comprises a branching device 21a, a delay medium 22, an optical isolator 24a, a multiplexer 21b, an amplification optical fiber 23, an optical isolator 24b, a light-receiving device 25, a pumping light source 26, and a control system 27. However, in order to suppress the above-mentioned static gain fluctuation, the optical amplifier 20 according to the second embodiment further comprises a branching device 21c for tapping part of light including output signals from the amplification optical fiber 23, and a spectrum analyzer 28 for monitoring the signal distribution within the signal wavelength band concerning the part of light tapped by the branching device 21c.

The control system 27 carries out AGC by utilizing the above-mentioned linear expression of $P_P = a \cdot P_{IN} + b$ (where a and b are constants) defining the relationship between the power $P_{IN}$ of the part of light tapped by the branching device 21a and the power $P_P$ of pumping light outputted from the pumping light source. It aims at enabling higher-speed control based on feed-forward control. However, even when the above-mentioned transient output signal level fluctuations are suppressed during the control time $t_2$, there is a possibility of the static gain variation $P_Q$ occurring if AGC is carried out in a state where the average value (time average) of saturation power of output signals varies between before and after a fluctuation as shown in FIG. 1. Therefore, in the optical amplifier 20 according to the second embodiment, the control system 27 detects the signal distribution within the signal wavelength band at the output end of amplification optical fiber 23 by way of the spectrum analyzer 28, so as to update the constants a and b in the above-mentioned linear expression (2) utilized for AGC, thereby effectively suppressing the static gain fluctuation $P_Q$.

Figure 5:
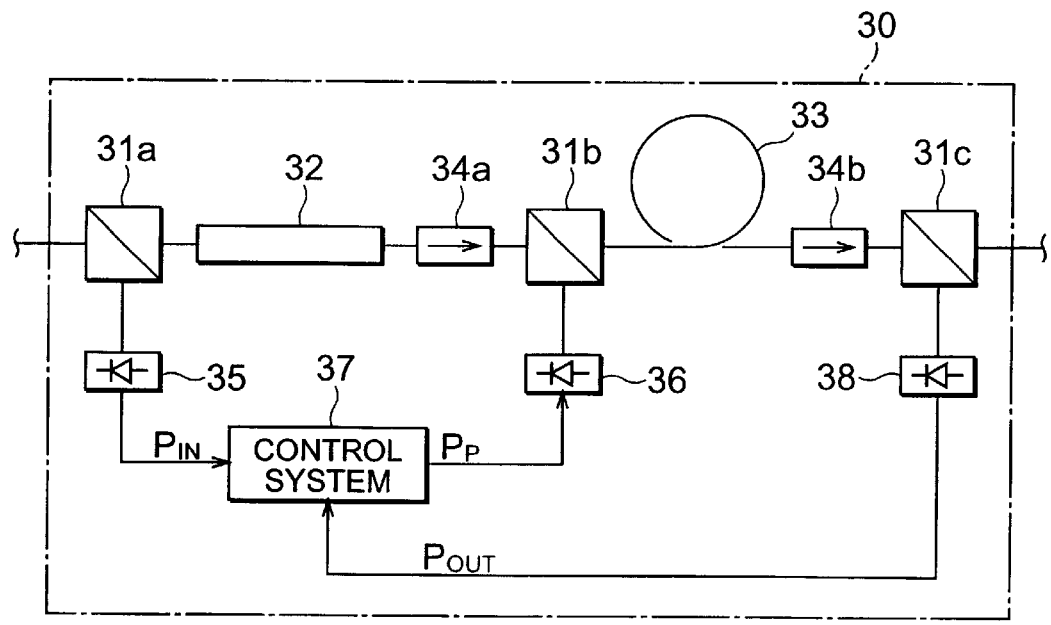
FIG. 5 is a diagram showing the configuration of a third embodiment of the optical amplifier according to the present invention.

FIG. 5 is a diagram showing the configuration of a third embodiment of the optical amplifier according to the present invention, which is characterized in that it comprises a configuration for lowering the static gain fluctuation $P_Q$ (see FIG. 1) as in the second embodiment.

Namely, as shown in FIG. 5, the optical amplifier 30 according to the third embodiment has the same configuration as that of the first and second embodiments, in that it comprises a branching device 31a, a delay medium 32, an optical isolator 34a, a multiplexer 31b, an amplification optical fiber 33, an optical isolator 34b, a light-receiving device 35, a pumping light source 36, and a control system 37. However, in order to suppress the above-mentioned static gain fluctuation, the optical amplifier 30 according to the third embodiment further comprises a branching device 31c for tapping part of light including output signals from the amplification optical fiber 33, and a light-receiving device 38 for detecting the power of the part of light tapped by the branching device 31c.

The control system 37 updates the constants a and b in the above-mentioned linear expression (2) utilized for AGC by using an amplification factor ($P_{OUT}/P_{IN}$) given by the ratio of the amplified optical power $P_{OUT}$ at the output end of the amplification optical fiber 33 to the power $P_{IN}$ of the part of light tapped by the branching device 31a.

Further, the optical amplifier according to the present invention can be modified in various manners. For example, there are many optical amplifiers each comprising a plurality of stages of amplifying sections. In such a configuration, if a delay medium is inserted immediately upstream the amplifying section at each stage, then the transmission loss within the optical amplifier increases, thereby deteriorating noise characteristics, which is unfavorable.

Therefore, the optical amplifier according to a fourth embodiment comprises a structure in which a delay medium is inserted immediately upstream only the amplifying section at the first stage, the power of signals before reaching the delay medium is detected, and the pumping light power is regulated for the amplifying section at each stage according to the result of detection.

Figure 6:
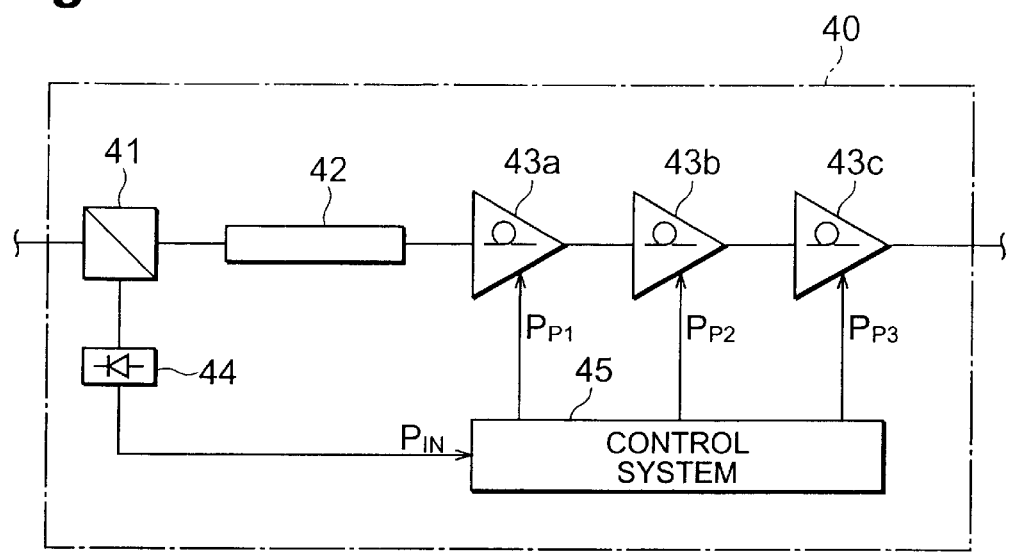
FIG. 6 is a diagram showing the configuration of a fourth embodiment of the optical amplifier according to the present invention.

FIG. 6 is a diagram showing the configuration of the fourth embodiment of the optical amplifier according to the present invention. In FIG. 6, the optical amplifier 40 according to the fourth embodiment comprises, successively in the advancing direction of signals propagated through the optical transmission line, a branching device 41 for tapping part of light including the signals, a delay medium 42, a plurality of stages of amplifying sections 43a to 43c (each comprising an amplification optical fiber and a pumping light source), a light-receiving device 44, and a control system 45 for feed-forward control (AGC) of each of the plurality of stages of amplifying sections 43a to 43c.

Since the optical amplifier 40 according to the fourth embodiment is configured such that the branching device 41 is provided upstream the plurality of stages of amplifying sections 43a to 43c, whereas part of light (including the signals) tapped by the branching device 41 is monitored, power fluctuations in input signals can be detected more rapidly than in a configuration in which power fluctuations in input signals are detected immediately upstream each amplifying section, thus enabling AGC which favorably follows the power fluctuations in input signals. Also, in the optical amplifier 40 according to the fourth embodiment, the delay medium 42 is disposed between the branching device 41 and the amplifying section 43a at the first stage in order for the respective timings for detecting the power fluctuation in input signals at the plurality of stages of amplifying sections 43a to 43c and regulating the pumping light power (outputting control signals $P_{P1}$ to $P_{P3}$ from the control system 45 to respective pumping light sources included in the individual amplifying sections 43a to 43c) to apparently coincide with each other.

The optical amplifier 40 according to the fourth embodiment comprising the plurality of stages of amplifying sections 43a to 43c downstream the delay medium 42 as such is suitable for WDM transmission systems in which OADM (Optical Add/Drop Multiplexer), OXC (Optical Cross Connect), and the like are inserted.

In a WDM transmission system incorporated with OADM or OXC, there are often cases where the power fluctuation in input signals to the optical amplifier abruptly changes due to changes in the number of signal channels. In such a case, the applied optical amplifier is required to rapidly control the gain so as to keep it constant. The optical amplifier 40 according to the fourth embodiment can detect the power fluctuation in input signals to each of the plurality of amplifying sections 43a to 43c before amplification, and can effectively suppress transient output signal power fluctuations.

The optical amplifier according to the present invention may further comprise a configuration in which signals to be fed into the delay medium are amplified beforehand.

Figure 7:
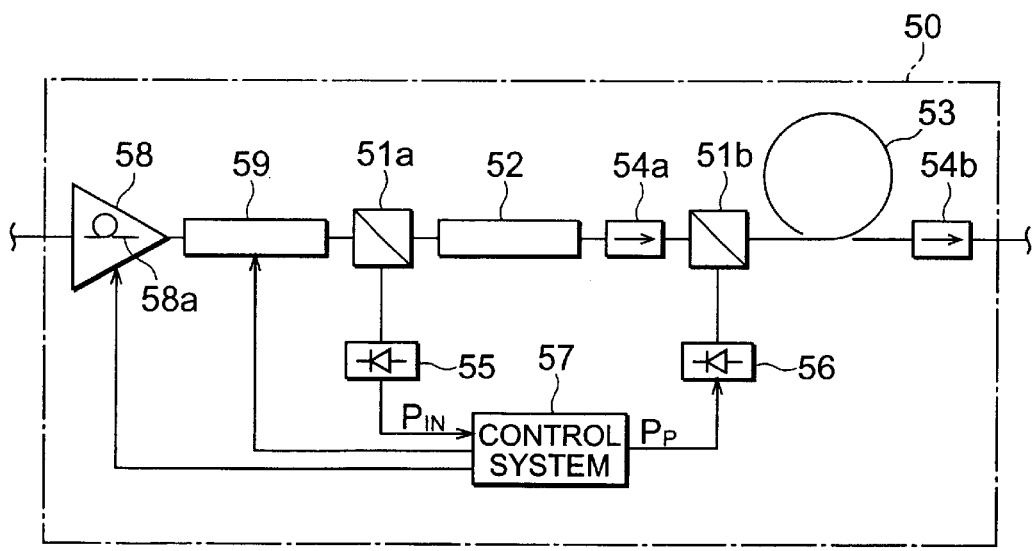
FIG. 7 is a diagram showing the configuration of a fifth embodiment of the optical amplifier according to the present invention.

FIG. 7 is a diagram showing the configuration of a fifth embodiment of the optical amplifier according to the present invention.

Basically as in the first embodiment, the optical amplifier 50 according to the fifth embodiment comprises, successively in the advancing direction of signals, a branching device 51a, a delay medium 52, an optical isolator 54a, a multiplexer 51b, an amplification optical fiber 53, and an optical isolator 54b, which constitute a part of an optical transmission line. It further comprises a light-receiving device 55 for monitoring power fluctuations of the part of light tapped by the branching device 51a, and a pumping light source 56 for supplying pumping light to the amplification optical fiber by way of the multiplexer 51b; and is configured such that a control system 57 detects power fluctuations in input signals by way of the light-receiving device 55 and controls (in AGC fashion) the pumping light source 56.

In particular, the optical amplifier 50 according to the fifth embodiment is characterized in that an amplifying section 58 (including an amplification optical fiber 58a) for amplifying input signals before detection is disposed upstream the branching device 51a. Disposed between the amplifying section 58 and the branching device 51a is an optical device 59 comprising one of a variable attenuator and a band-pass filter. Hence, in the optical amplifier 50 according to the fifth embodiment, a part of the optical transmission line is constituted by at least the delay medium 52 and two amplification optical fibers 53, 58a disposed so as to sandwich the delay medium 52 therebetween.

Thus configured optical amplifier 50 according to the fifth embodiment can also detect power fluctuations in input signals before amplification, and can effectively suppress transient output signal power fluctuations.

Figure 8:
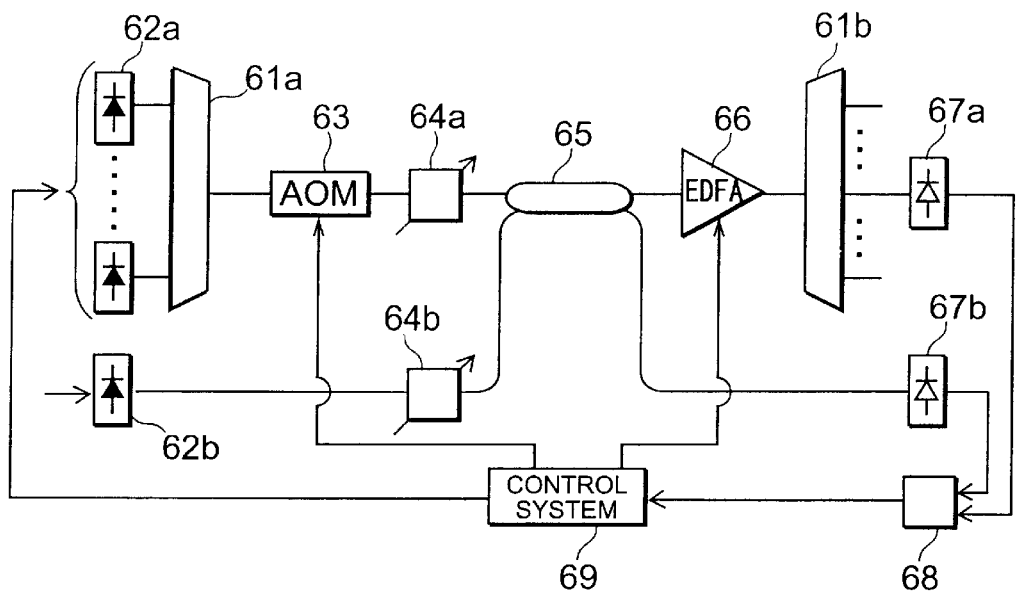
FIG. 8 is a diagram showing the structure of an experimental system for evaluating the amount of transient power fluctuation in output signals caused by the delay in pumping light power change with respect to changes in the number of signal channels.

Further, the inventor evaluated transient power fluctuations of output signals caused by delays in pumping light power changes with respect to changes in the number of signal channels for each of different pumping light wavelengths. FIG. 8 is a diagram showing the structure of its experimental system.

The experimental system of FIG. 8 comprises light sources 62a for outputting 8 channels of signals as a fluctuation signal, respectively; a variable-wavelength light source 62b for outputting a single channel of signal as a residual signal; a multiplexer 61a for multiplexing the 8 channels of signals from the light sources 62a; an AOM (acousto-Optic Modulator) 63 for transmitting therethrough or blocking the multiplexed signal from the multiplexer 61a; a variable attenuator 64a for attenuating the fluctuation signal from the light sources 62a; a variable attenuator 64b for attenuating the residual signal from the variable-length light source 62b; a fiber coupler 65 for multiplexing the fluctuation signal and residual signal together; an EDFA 66 as an optical amplifier for amplifying the light transmitted through the fiber coupler 65; a demultiplexer 61b for separating the signal amplified by the EDFA 66 into individual wavelengths; a light-receiving device 67b for receiving the signal before being inputted to the EDFA 66; a light-receiving device 61a for receiving the residual signal isolated by the demultiplexer 61b; an oscilloscope 68 for monitoring the respective signals of the light-receiving devices 67a, 67b; and a control system 69.

The modulation frequency of the AOM 63 controlled by the control system 69 is 1 kHz. For investigating the transient response characteristic of the residual signal power in the case where an input level fluctuation of 15 dB is caused by a change in the number of signal channels (e.g., the case where the number of signal channels changes from 32 to 1), the input level of fluctuation signal and input level of residual signal per channel of the 8 channels are set to −10.17 dBm/ch and −16 dBm/ch, respectively. The individual wavelengths of fluctuation signal are 1533.4 nm, 1536.6 nm, 1539.7 nm, 1542.9 nm, 1550.1 nm, 1553.3 nm, 1556.5 nm, and 1559.7 nm. In this experiment, the wavelength of residual signal is changed from 1531.8 nm to 1561.4 nm.

Prepared as the optical amplifier 66 are a copropagating pumping type EDFA having a pumping light wavelength of 0.98 μm and a copropagating pumping type EDFA having a pumping light wavelength of 1.48 μm.

Figure 9A:
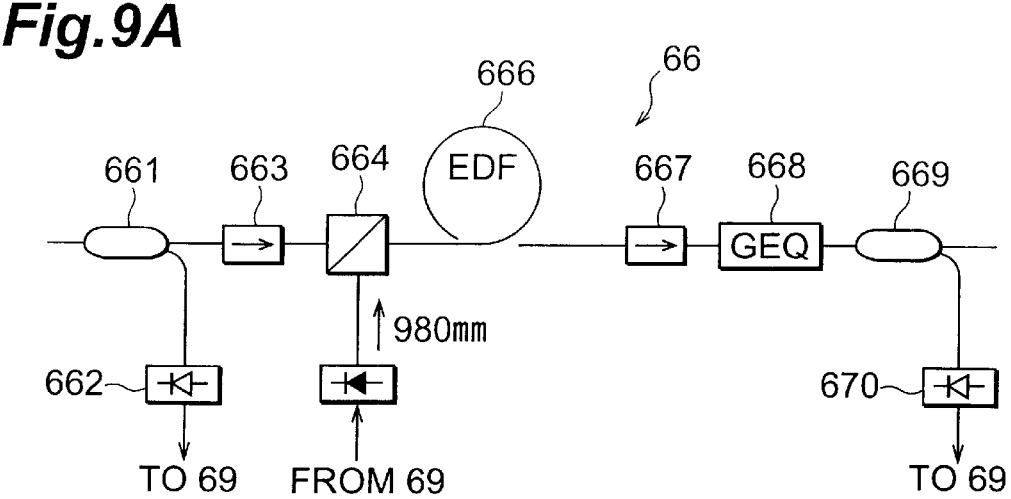

As shown in FIG. 9A, the copropagating pumping type EDFA having a pumping light wavelength of 0.98 μm comprises a coupler 661 (demultiplexer) for tapping part of light including a signal; a light-receiving device 662 for receiving the signal before amplification; an optical isolator 663; a pumping light source 665 for supplying pumping light having a wavelength of 0.98 μm; a multiplexer 664 for multiplexing the signal and the pumping light having a wavelength of 0.98 μm together; an amplification optical fiber 666 (EDF) doped with Er; an optical isolator 667; a gain equalizer (GEQ) 668; a coupler 669 for tapping part of light including the amplified signal; and a light-receiving device 670 for receiving the part of light tapped by the coupler 669. Here, the copropagating pumping type EDFA having a pumping light wavelength of 0.98 μm is adjusted so as to yield a gain with a power level of +12.5 dBm with respect to an input signal having a power level of −1 dBm.

Figure 9B:
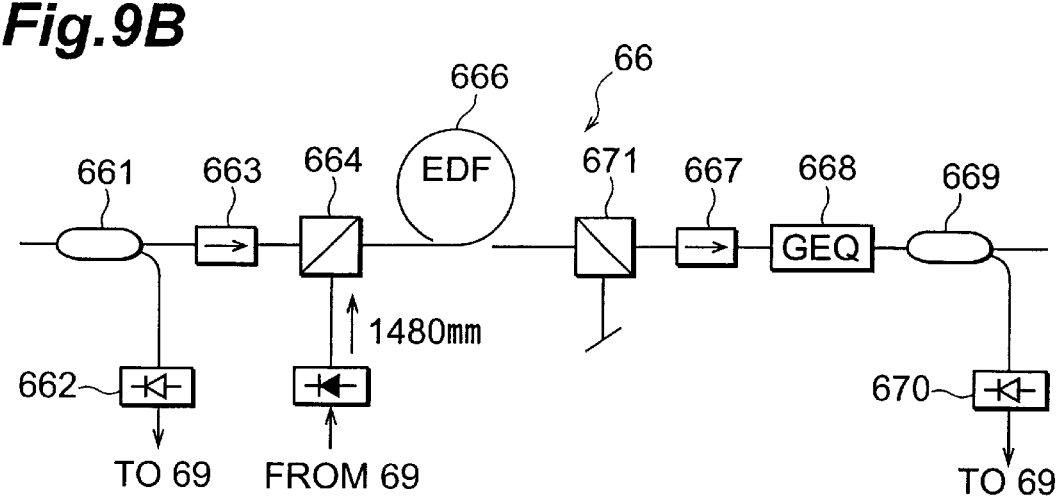
FIG. 9B is a diagram showing the structure of an optical amplifier utilizing pumping light having a wavelength of 1.48 $\mu$m.

On the other hand, as shown in FIG. 9B, the copropagating pumping type EDFA having a pumping light wavelength of 1.48 μm comprises a coupler 661 (demultiplexer) for tapping part of light including a signal; a light-receiving device 662 for receiving the signal before amplification; an optical isolator 663; a pumping light source 665 for supplying pumping light having a wavelength of 1.48 μm; a multiplexer 664 for multiplexing the signal and the pumping light having a wavelength of 1.48 μm together; an amplification optical fiber 666 (EDF) doped with Er; a demultiplexer 671; an optical isolator 667; a gain equalizer (GEQ) 668; a coupler 669 for tapping part of light including the amplified signal; and a light-receiving device 670 for receiving the part of light tapped by the coupler 669. Here, the copropagating pumping type EDFA having a pumping light wavelength of 1.48 μm is adjusted so as to yield a gain with a power level of +11.4 dBm with respect to an input signal having a power level of −1 dBm.

Figure 10A:
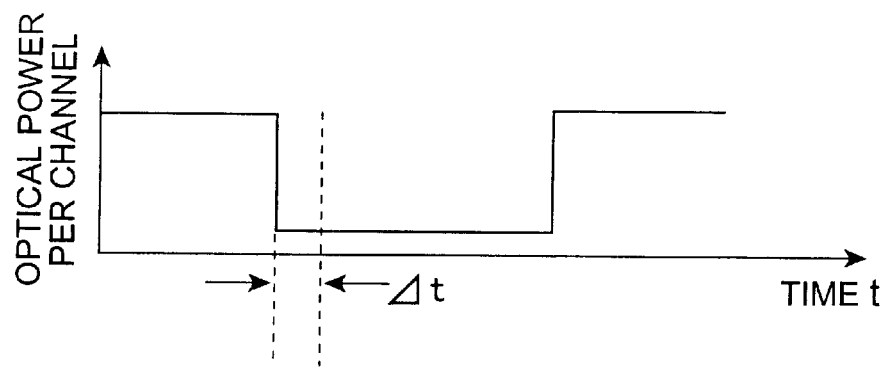
Figure 10B:
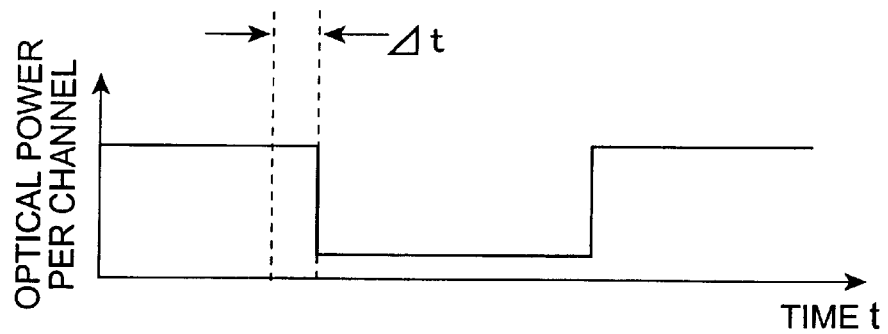
FIG. 10B is a graph showing the time response of pumping light power.

In the EDFA 66 of each of FIGS. 9A and 9B, the control system 69 drives the pumping light source 665 in synchronization with the AOM 63. The delay time Δt of the pumping light power change with respect to the change in the number of signal channels is changed when the control system 69 regulates the phase of the control signal to the AOM 63 and the phase of the control signal to the pumping light source 665 as shown in FIGS. 10A and 10B. Here, FIG. 11A is a graph showing the time response of the input light power, whereas FIG. 10B is a graph showing the time response delayed by the time Δt of the pumping light power.

Figure 11A:
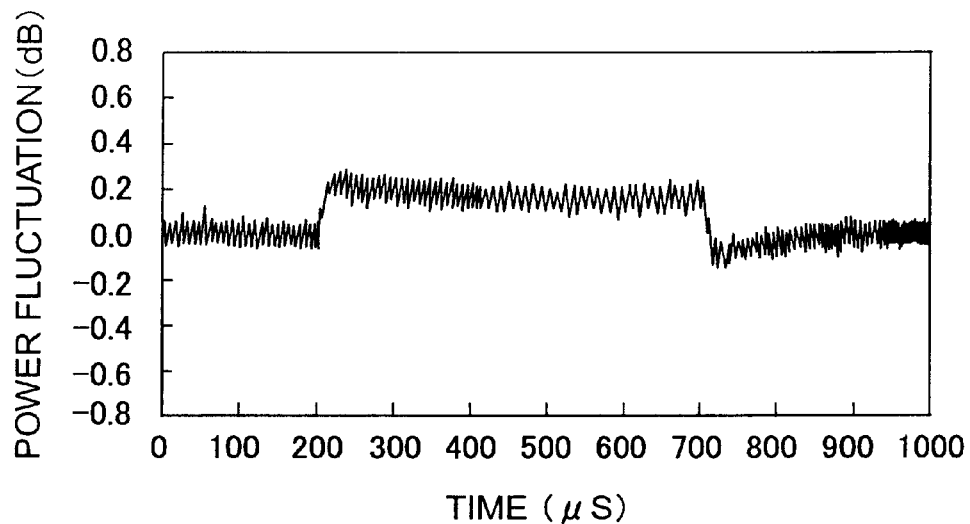
Figure 11B:
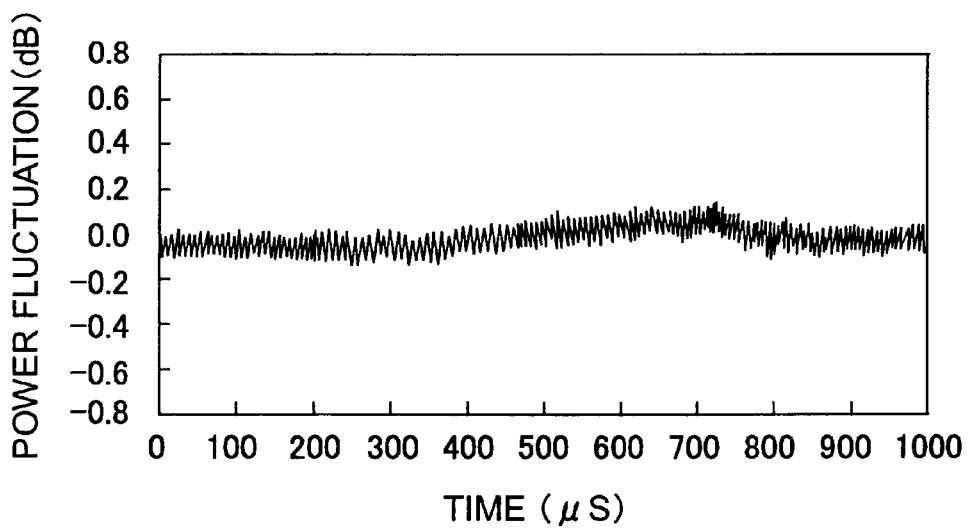
FIG. 11B is a graph showing the transient response characteristic with respect to a residual signal having a wavelength of 1551.7 nm concerning the optical amplifier having a pumping light wavelength of 1.48 $\mu$m shown in FIG. 9B.

FIG. 11A shows the transient response characteristic concerning the copropagating pumping type EDFA having a pumping light wavelength of 0.98 μm shown in FIG. 9A with respect to the residual signal having a wavelength of 1551.7 nm. FIG. 11B shows the transient response characteristic concerning the copropagating pumping type EDFA having a pumping light wavelength of 1.48 μm shown in FIG. 9B with respect to the residual signal having a wavelength of 1551.7 nm. Here, the delay time of pumping light power change with respect to the fluctuation in the number of signal channels is zero (the case where the pumping light power is changed at the same time when the number of signal channels fluctuates).

As can be seen from these measurement results, while an overshoot of 0.2 dB is generated in the copropagating pumping type EDFA having a pumping light wavelength of 0.98 μm (see FIG. 11A), substantially no overshoot is generated in the copropagating pumping type EDFA having a pumping light wavelength of 1.48 μm (see FIG. 11B).

Figure 12A:
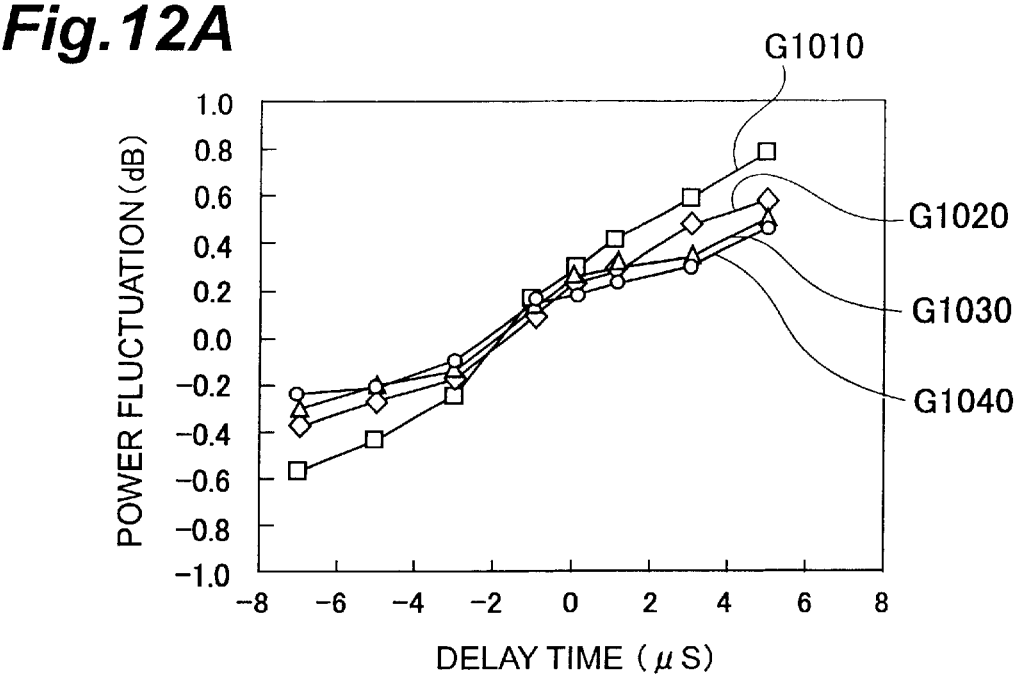
Figure 12B:
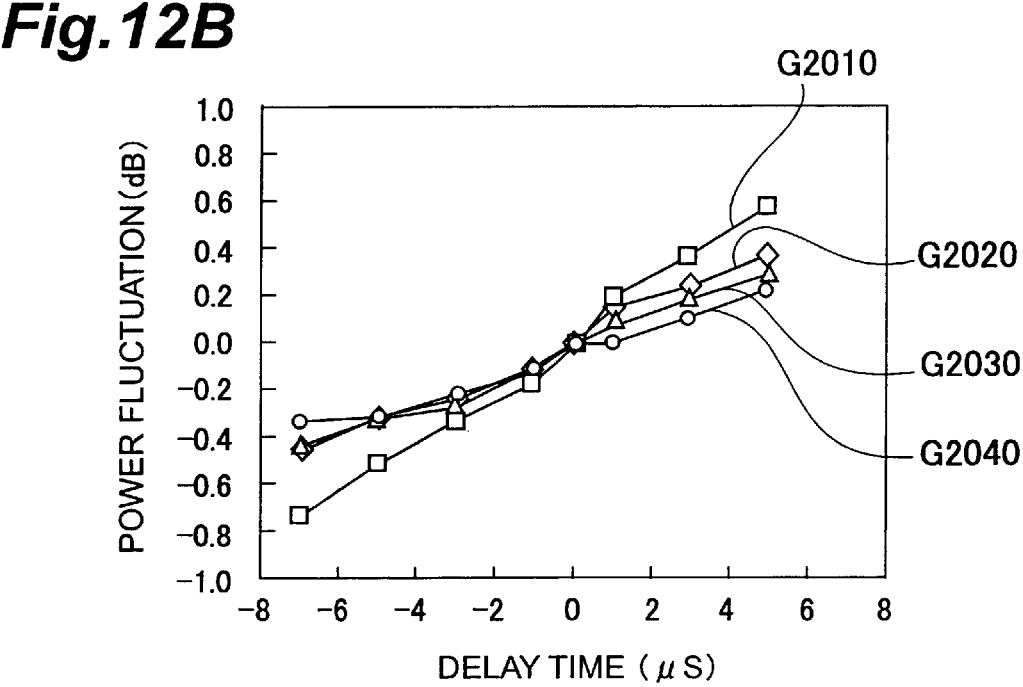
FIG. 12B is a graph showing the dependence of transient response characteristic upon delay time concerning the optical amplifier having a pumping light wavelength of 1.48 $\mu$m shown in FIG. 9B with respect to each of residual signals having a wavelength ranging from 1531.7 nm to 1561.4 nm.

FIG. 12A shows the dependence of transient power fluctuation upon the delay time concerning the optical amplifier having a pumping light wavelength of 0.98 μm shown in FIG. 9A with respect to each of residual signals having a wavelength ranging from 1531.7 nm to 1561.4 nm, whereas FIG. 12B shows the dependence of transient power fluctuation upon the delay time concerning the optical amplifier having a pumping light wavelength of 1.48 μm shown in FIG. 9B with respect to each of residual signals having a wavelength ranging from 1531.7 nm to 1561.4 nm. In each of FIGS. 12A and 12B, the delay time in the abscissa indicates that the fluctuation in pumping light power occurs earlier than the fluctuation in the number of signal channels when expressed with the minus sign, and that the fluctuation in the number of signal channels occurs earlier than the fluctuation in pumping light power when expressed with the plus sign. In FIG. 12A, curves G1010, G1020, G1030, and G1040 indicate the power fluctuations with respect to residual signals having wavelengths of 1531.7 nm, 1541.3 nm, 1551.7 nm, and 1561.4 nm, respectively. In FIG. 12B, curves G2010, G2020, G2030, and G2040 indicate the power fluctuations with respect to residual signals having wavelengths of 1531.7 nm, 1541.3 nm, 1551.7 nm, and 1561.4 nm, respectively.

From the results of FIGS. 12A and 12B, it can be seen that (a) the increase in power fluctuation caused by the increase in delay time becomes greater as the wavelength of residual signal is shorter, whereas such a phenomenon does not depend on the wavelength of pumping light; (b) the transient power fluctuation can fully be suppressed in the copropagating pumping type EDFA having a pumping light wavelength of 1.48 µm when the pumping light power is changed by a required amount simultaneously with the fluctuation in the number of signal channels; (c) the transient power fluctuation cannot fully be suppressed in the copropagating pumping type EDFA having a pumping light wavelength of 0.98 µm even when the pumping light power is changed by a required amount simultaneously with the fluctuation in the number of signal channels; (d) there is a possibility that the transient power fluctuation can be suppressed when the fluctuation starting time of the pumping light power is set so as to occur earlier by about 2 µm than the time when a signal reaches the input end of the amplification optical fiber by way of the delay medium after a change in the number of signal channels is detected; and so forth.

The above-mentioned point (a) results from the fact that the transient response becomes faster as the signal wavelength is shorter in EDFAs. From the result of the above-mentioned point (b), it is seen that the transient power fluctuation can be suppressed when the control circuit is accelerated by AGC in the copropagating pumping type EDFA having a pumping wavelength of 1.48 µm if the response time is ideally set to zero (causing the response time of the control circuit to become zero being unrealistic, though). From the results of the above-mentioned points (c) and (d), it is seen that, while the transient power fluctuation cannot be suppressed in the copropagating pumping type EDFA having a pumping wavelength of 0.98 µm even when the response time of EDFA is set to zero by AGC, there is a possibility of the transient power fluctuation being suppressed if the power fluctuation of input signal is forecast and then the pumping light power is controlled earlier by about 2 µs than the fluctuation in signal channels occurring at the input end of the amplification optical fiber.

The foregoing difference in response time of EDFA depending on the pumping light wavelength is assumed to be because of the fact that, while the copropagating pumping type EDFA having a pumping wavelength of 0.98 µm is of a two-level type, the copropagating pumping type EDFA having a pumping wavelength of 1.48 µm is of a three-level type and its $^4I_{11/2}$ level has a relaxation time of about several µs.

From the results of the foregoing FIGS. 11A to 12B, it is necessary for the copropagating pumping type EDFA having a pumping wavelength of 0.98 µm to forecast the fluctuation in the number of signal channels before a signal reaches the input end of the amplification optical fiber and then control the pumping light power.

Figure 13A:
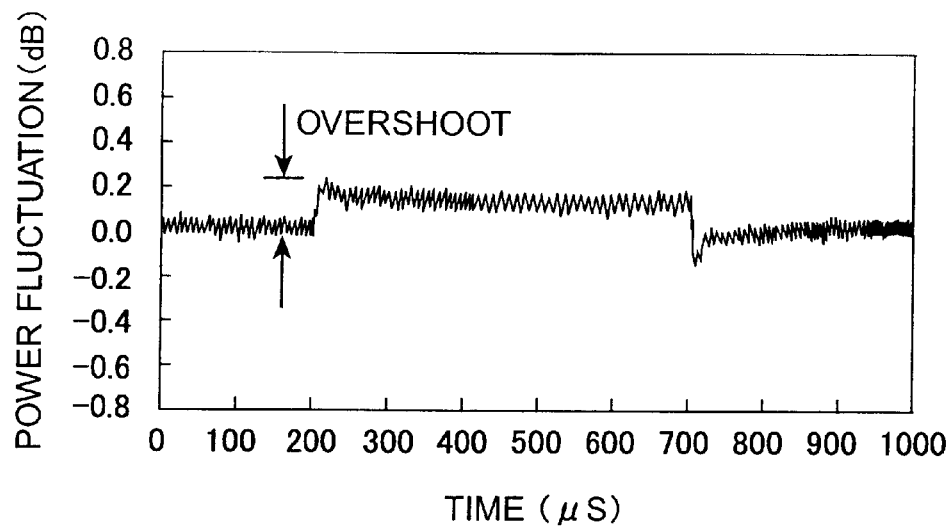
Figure 13B:
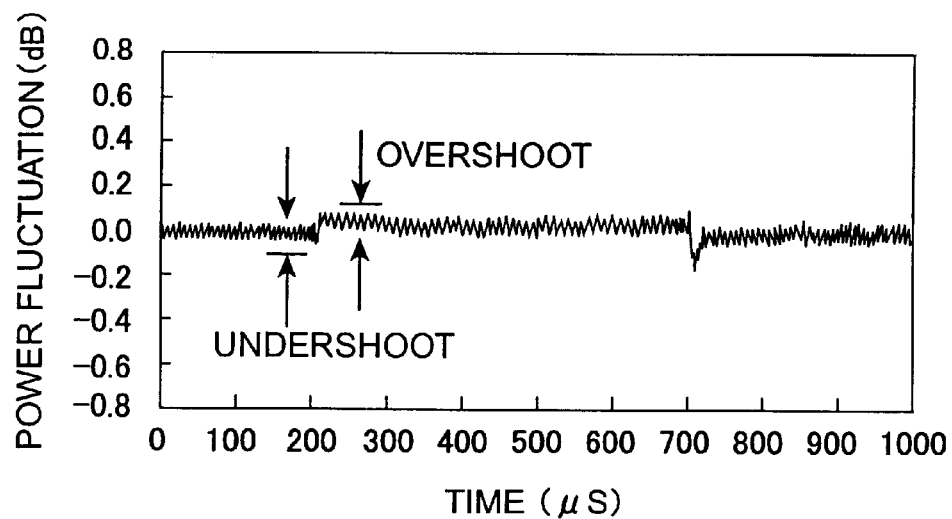
FIG. 13B is a graph showing the transient response characteristic with respect to a residual signal having a wavelength of 1551.7 nm in the case where a single-mode optical fiber having a length of 400 nm is employed as the delay medium in the optical amplifier shown in FIG. 5.

Therefore, utilizing the delay medium, the optical amplifier according to the present invention adjusts the time from when the fluctuation in the number of signal channels is detected until when the signal reaches the input end of the amplification optical fiber. FIG. 13A shows the transient response characteristic of an EDFA as a comparative example obtained when the delay medium 32 is removed from the optical amplifier (EDFA) shown in FIG. 5, whereas FIG. 13B shows the transient response characteristic of an EDFA employing a single-mode optical fiber having a length of 400 m as the delay medium 32 with respect to a residual signal having a wavelength of 1551.7 nm. Here, the single-mode optical fiber having a length of 400 nm employed as the delay medium 32 imparts a delay of about 2 µs to the signal propagation time.

As can be seen from FIG. 13A, an overshoot of about 0.2 dB occurs in the power fluctuation of output signal in the EDFA having no delay medium. In the EDFA including a single-mode optical fiber having a length of 400 m, on the other hand, an undershoot of about 0.1 dB occurs whereas the overshoot is suppressed to about 0.1 dB as can be seen from FIG. 13B. As a consequence, though the transient power fluctuation width does not change, the maximum power fluctuation value is lowered in the EDFA employing a single-mode optical fiber as the delay medium 32. Therefore, in view of the fact that transient power fluctuations accumulate in an optical communication system in which a plurality of optical amplifiers are connected in a multistage fashion (see the Sun reference), it can be seen that the optical amplifier that can suppress the maximum power fluctuation value to a low value though not changing the power fluctuation width is more suitably employed in the optical communication system in which a plurality of optical amplifiers are connected in a multistage fashion.

Preferably, the optical fiber employed as the delay medium has a lower loss per length. This is because of the fact that the deterioration in the noise characteristic of the optical amplifier can be suppressed to the minimum thereby. Also, optical fibers in which the increase in loss caused by the bending loss is small are suitable for the delay medium. This is because of the fact that the optical amplifier itself can be made smaller when the optical fiber having a low bending loss is employed as the delay medium. In particular, an optical amplifier having a low loss and a small size can be realized when a pure silica core fiber is employed as the delay medium.

In the EDFA having a pumping wavelength of 1.48 µm, though the transient power fluctuation can be suppressed when the response time of so-called control circuit is set to zero if the pumping light power is changed simultaneously with the fluctuation in the number of signal channels, it is very difficult for the control circuit to shorten the response time to 1 µs or less in practice. When a considerable delay time is imparted to the signal by the delay medium, the power fluctuation of output signals can efficiently be suppressed, and the response time of the control circuit can be alleviated even in such an EDFA having a pumping wavelength of 1.48 µm.

Since fluctuations of signal power accumulates in an optical communication system in which a plurality of optical amplifiers are connected in a multistage fashion, the fluctuation of signal power per stage can be made smaller when the optical amplifier employing the delay medium in the front stage of the amplification optical fiber is used in such an optical communication system in which a plurality of optical amplifiers are connected in a multistage fashion or an optical communication system having a light multiplexing/demultiplexing structure such as OADM, OXC, or the like.

As in the foregoing, since a delay medium having an insertion loss of 3 dB or less is disposed upstream the amplification optical fiber so as to enable feed-forward control which reduces the difference between the timing for detecting power fluctuations in input signals and the timing for starting the pumping light power control, the present invention can effectively restrain transient power fluctuations in amplified signals outputted from the amplification optical fiber from occurring due to the above-mentioned difference. Since the insertion loss of the delay medium is 3 dB or less, it is also effective in improving the noise figure of the optical amplifier.

Further, the optical amplifier is effective in efficiently suppressing transient power fluctuations of output signals outputted from the optical amplifier by appropriately adjusting the delay time caused by the delay medium in response to the pumping light wavelength.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplifier disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system controlling said pumping light source by monitoring said power of said part of light tapped by said first branching device through said first light-receiving device and regulating a power of said pumping light in conformity to a power fluctuation of said tapped part of light.

2. An optical amplifier according to claim 1, wherein said control system carries out automatic gain control by utilizing a linear expression $P_p = a \cdot P_{IN} + b$ (where a and b are constants) which provides a relationship between the power $P_{IN}$ of said part of light tapped by said first branching device and the power $P_p$, of said pumping light outputted from said pumping light source.

3. An optical amplifier according to claim 2, wherein said control system detects a signal distribution within said signal wavelength band at an output end of said amplification optical fiber, and updates said constants a and b in said linear expression utilized for automatic gain control.

4. An optical amplifier disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system monitoring said power of said part of light tapped by said first branching device through said first light-receiving device, and controlling said pumping light source so as to regulate a power of said pumping light in conformity to a power fluctuation of said tapped part of light;

wherein said delay medium imparts a signal delay time which is identical to or longer than a response time of said control system from when said power fluctuation is detected until when said control of said pumping light source is started.

5. An optical amplifier disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system controlling said pumping light source by monitoring said power of said part of light tapped by said first branching device through said first light-receiving device and regulating a power of said pumping light in conformity to a power fluctuation of said tapped part of light;

wherein said delay medium imparts a signal delay time which is identical to or longer than a response time of said control system from when said power fluctuation is detected until when said control of said pumping light source is started, wherein said pumping light supplied from said pumping light source has a wavelength of 0.98 $\mu$m.

6. An optical amplifier according to claim 4, wherein said pumping light supplied from said pumping light source has a wavelength of 1.48 $\mu$m.

7. An optical amplifier according to claim 1, wherein said delay medium has an insertion loss of 3 dB or less.

8. An optical amplifier, disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system controlling said pumping light source by monitoring said power of said part of light tapped by said first branching device through said first light-receiving device and regulating a power of said pumping light in conformity to a power fluctuation of said tapped part of light;

wherein said delay medium provides a signal delay time of at least 1 μs but not longer than 50 μs.

9. An optical amplifier disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system controlling said pumping light source by monitoring said power of said part of light tapped by said first branching device through said first light-receiving device and regulating a power of said pumping light in conformity to a power fluctuation of said tapped part of light;

wherein said delay medium includes a single-mode optical fiber having a length of at least 0.2 km but not longer than 10 km.

10. An optical amplifier according to claim 9, wherein said delay medium includes a dispersion-shifted optical fiber.

11. An optical amplifier according to claim 9, wherein said delay medium includes a dispersion-compensating optical fiber arranged between said single-mode optical fiber and said amplification optical fiber.

12. An optical amplifier according to claim 1, wherein said delay medium provides a signal delay time longer than a response time of said control system from when said power fluctuation is detected until said control of said pumping light source is started.

13. An optical amplifier according to claim 12, wherein said pumping light supplied from said pumping light source has a wavelength of 0.98 μm.

14. An optical amplifier disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system controlling said pumping light source by monitoring said power of said part of light tapped by said first branching device through said first light-receiving device and regulating a power of said pumping light in conformity to a power fluctuation of said tapped part of light;

wherein said signal delay time given by said delay medium is adjusted such that, in terms of a transient fluctuation of gain in said optical amplifier caused by a power fluctuation in light including said signals with respect to a target gain, said gain yields an overshoot amount and an undershoot amount which are substantially identical to each other.

15. An optical amplifier according to claim 1, wherein said delay medium provides a signal delay time substantially identical to a response time of said control system from when said power fluctuation is detected until when said control of said pumping light source is started.

16. An optical amplifier according to claim 15, wherein said pumping light supplied from said pumping light source has a wavelength of 1.48 μm.

17. An optical amplifier disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system controlling said pumping light source by monitoring said power of said part of light tapped by said first branching device through said first light-receiving device and regulating a power of said pumping light in conformity to a power fluctuation of said tapped part of light;

wherein said delay medium imparts a signal delay time which is identical to or longer than a response time of said control system from when said power fluctuation is detected until when said control of said pumping light source is started;

wherein said control system carries out automatic gain control by utilizing a linear expression $P_p = a \cdot P_{IN} + b$ (where a and b are constants) which provides a relationship between the power $P_{IN}$ of said part of light tapped by said first branching device and the power $P_p$ of said pumping light outputted from said pumping light source.

18. An optical amplifier according to claim 17, further comprising a spectrum analyzer for monitoring a signal distribution within said signal wavelength band at an output end of said amplification optical fiber.

19. An optical amplifier according to claim 18, wherein said control system detects a signal distribution within said signal wavelength band at said output end of said amplification optical fiber, and updates said constants a and b in said linear expression utilized for automatic gain control.

20. An optical amplifier according to claim 17, wherein said control system updates said constants a and b in said linear expression utilized for automatic gain control by detecting an amplification factor ($P_{OUT}/P_{IN}$) given by the ratio between the optical power $P_{OUT}$ at an output end of said amplification optical fiber and the power $P_{IN}$ of said part of light tapped by said branching device.

21. An optical amplifier disposed on an optical transmission line through which a plurality of channels of signals included in a predetermined wavelength band propagate, said optical amplifier comprising:

a first branching device for tapping part of light including said signals propagating through said optical transmission line;

a first light-receiving device for detecting a power of said part of light tapped by said first branching device;

an amplification optical fiber for amplifying said signals;

a pumping light source for supplying pumping light of a predetermined wavelength to said amplification optical fiber;

a delay medium arranged between said first branching device and said amplification optical fiber; and a control system for carrying out automatic gain control, said control system controlling said pumping light source by monitoring said power of said part of light tapped by said first branching device through said first light-receiving device and regulating a power of said pumping light in conformity to a power fluctuation of said tapped part of light, further comprising:

a second branching device for tapping part of amplified light transmitted through said amplification optical fiber, and a second light-receiving device for detecting a power of said part of light tapped by said second branching device;

wherein said control system monitors respective powers of parts of light tapped by said first and second branching devices and controls said pumping light source so as to regulate a power of said pumping light according to results of detection obtained by said first and second light-receiving devices.

22. An optical communication system including a plurality of optical amplifiers at least one of which has a structure identical to that of the optical amplifier according to claim 1.

23. An optical communication system according to claim 22, wherein said optical communication system comprises a structure for enabling at least one of a branching function of tapping part of multiplexed signals propagating through a transmission line by a signal channel unit, and an inserting function of sending out a predetermined wavelength of signals or multiplexed signals to a transmission line by a signal channel unit.

* * * * *